US011964309B2

(12) United States Patent
Eom et al.

(10) Patent No.: US 11,964,309 B2
(45) Date of Patent: Apr. 23, 2024

(54) SUBSTRATE TREATMENT APPARATUS AND METHOD

(71) Applicant: SEMES CO., LTD., Chungcheongnam-do (KR)

(72) Inventors: Sung Hun Eom, Gyeonggi-do (KR); Sung Ho Lee, Gyeonggi-do (KR); Ju Yong Jang, Gyeonggi-do (KR)

(73) Assignee: SEMES CO., LTD., Cheonan-si (KR)

( * ) Notice: Subject to any disclaimer, the term of this patent is extended or adjusted under 35 U.S.C. 154(b) by 0 days.

(21) Appl. No.: 17/738,010

(22) Filed: May 6, 2022

(65) Prior Publication Data

US 2023/0071392 A1 Mar. 9, 2023

(30) Foreign Application Priority Data

Sep. 3, 2021 (KR) ........................ 10-2021-0117867

(51) Int. Cl.
*B08B 13/00* (2006.01)
*B08B 3/12* (2006.01)
*B08B 5/02* (2006.01)

(52) U.S. Cl.
CPC .............. *B08B 3/123* (2013.01); *B08B 5/023* (2013.01)

(58) Field of Classification Search
None
See application file for complete search history.

(56) References Cited

U.S. PATENT DOCUMENTS

2001/0006072 A1 * 7/2001 Kobayashi .............. B08B 3/123
134/198

FOREIGN PATENT DOCUMENTS

| | | |
|---|---|---|
| JP | 10296200 A * | 11/1998 |
| JP | 2004-255225 | 9/2004 |
| KR | 10-2001-0057041 | 7/2001 |
| KR | 10-2018-0069643 | 6/2018 |

OTHER PUBLICATIONS

Google Patents translation of JPH10296200A (Year: 2023).*

* cited by examiner

*Primary Examiner* — Eric W Golightly
(74) *Attorney, Agent, or Firm* — Ladas & Parry, LLP

(57) ABSTRACT

A substrate treatment apparatus includes: a first bath storing a cleaning solution and having a first opening formed in an upper surface thereof; and a first ultrasonic oscillator installed in the first bath and providing ultrasonic waves toward a surface of the cleaning solution exposed by the first opening to form a water film protruding from the surface of the cleaning solution, wherein a substrate is not immersed in the first bath, and a surface of the substrate is placed adjacent to the first opening and cleaned by the water film.

15 Claims, 13 Drawing Sheets

SUBSTRATE TREATMENT APPARATUS AND METHOD

This application claims the benefit of Korean Patent Application No. 10-2021-0117867, filed on Sep. 3, 2021, in the Korean Intellectual Property Office, the disclosure of which is incorporated herein in its entirety by reference.

BACKGROUND

1. Technical Field

The present disclosure relates to a substrate treatment apparatus and method.

2. Description of the Related Art

Inkjet printing equipment ejects ink to a test film to measure impact accuracy. Test films are expensive because they are discarded after use. Therefore, it is necessary to develop a continuous cleaning apparatus capable of repeatedly reusing a test film by cleaning the test film and thus having improved workability.

SUMMARY

Aspects of the present disclosure provide a substrate treatment apparatus with improved workability.

Aspects of the present disclosure also provide a substrate treatment method with improved workability.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a substrate treatment apparatus comprising a first bath storing a cleaning solution and having a first opening formed in an upper surface thereof; and a first ultrasonic oscillator installed in the first bath and providing ultrasonic waves toward a surface of the cleaning solution exposed by the first opening to form a water film protruding from the surface of the cleaning solution, wherein a substrate is not immersed in the first bath, and a surface of the substrate is placed adjacent to the first opening and cleaned by the water film.

According to another aspect of the present disclosure, there is provided a substrate treatment apparatus comprising: a first bath storing a cleaning solution and having a first opening formed in an upper surface thereof; a first ultrasonic oscillator installed in the first bath and providing ultrasonic waves of a first frequency toward a surface of the cleaning solution exposed by the first opening to form a first water film protruding from the surface of the cleaning solution; a second bath located on a side of the first bath, storing a cleaning solution, and having a second opening formed in an upper surface thereof; and a second ultrasonic oscillator installed in the second bath and providing ultrasonic waves of a second frequency greater than the first frequency toward a surface of the cleaning solution exposed by the second opening to form a second water film protruding from the surface of the cleaning solution, wherein as a substrate wound in a roll shape is unwound, the substrate sequentially passes above the first bath and above the second bath without being immersed in the first bath and the second bath, a surface of the substrate is cleaned by the first water film and the second water film as the surface of the substrate passes near the first opening and the second opening, and the first bath comprises a first sidewall not facing the second bath and a second sidewall facing the second bath, wherein a second height of the second sidewall is higher than a first height of the first sidewall.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
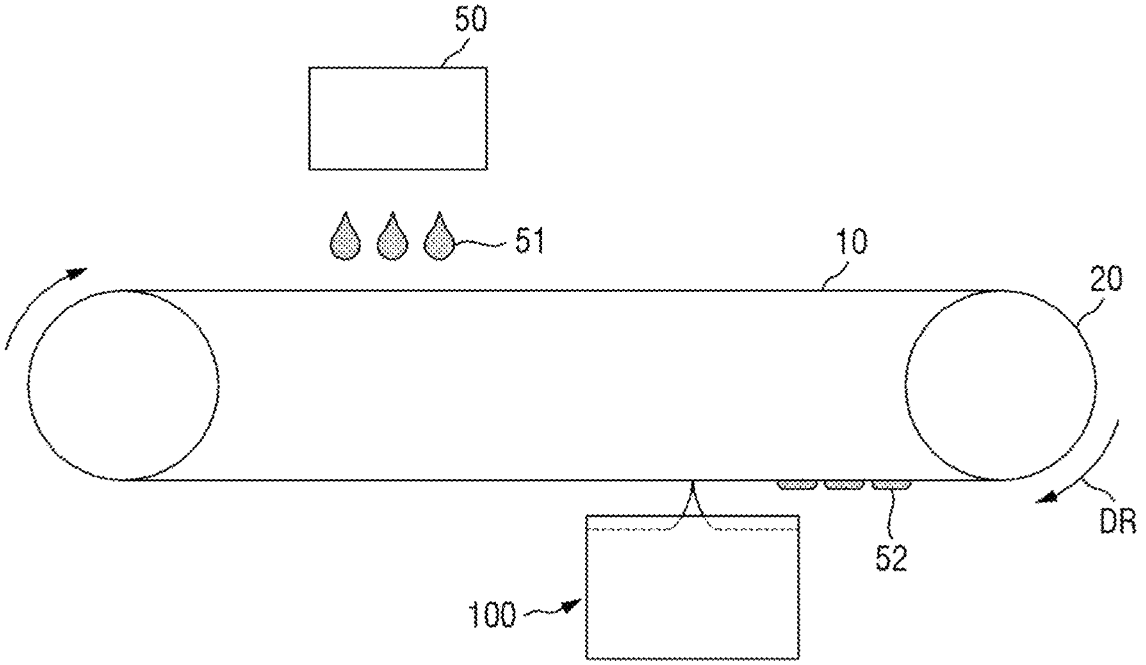
FIG. 1 is a conceptual diagram illustrating a substrate treatment apparatus according to a first embodiment of the present disclosure.

Hereinafter, exemplary embodiments of the present disclosure will be described in greater detail with reference to the attached drawings. Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. Like reference numerals refer to like elements throughout the specification.

Spatially relative terms, such as “below,” “beneath,” “lower,” “above,” “upper” and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" or "beneath" can encompass both an orientation of above and below. The device may be otherwise oriented and the spatially relative descriptors used herein interpreted accordingly.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present disclosure.

Hereinafter, embodiments of the present disclosure will be described in detail with reference to the attached drawings. In the following description with reference to the attached drawings, like or corresponding elements will be indicated by like reference numerals, and a redundant description thereof will be omitted.

Figure 2:
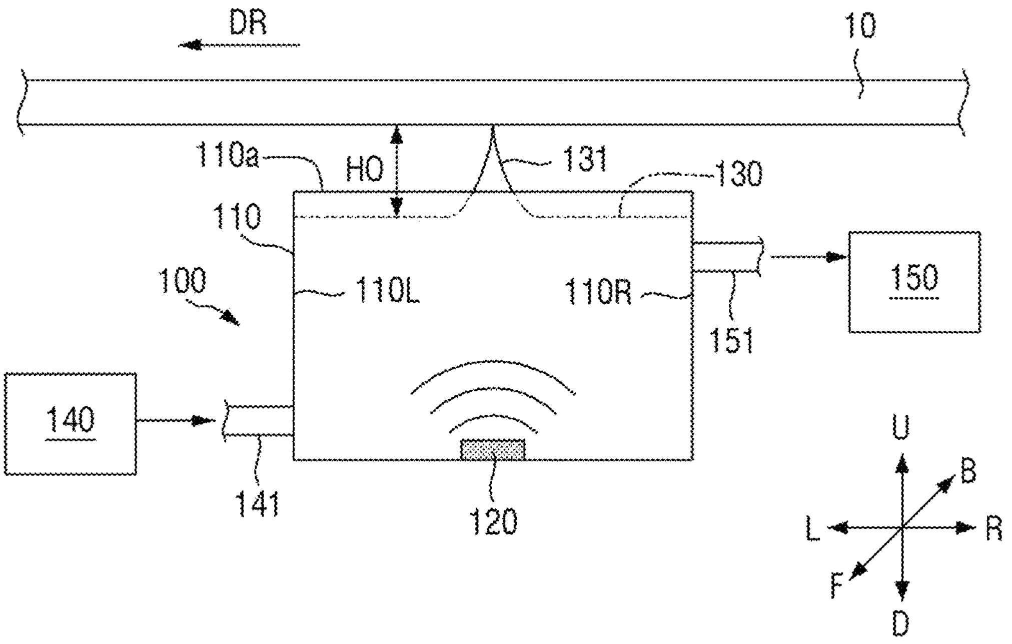
FIG. 2 illustrates a cleaning unit illustrated in FIG. 1.
Figure 3:
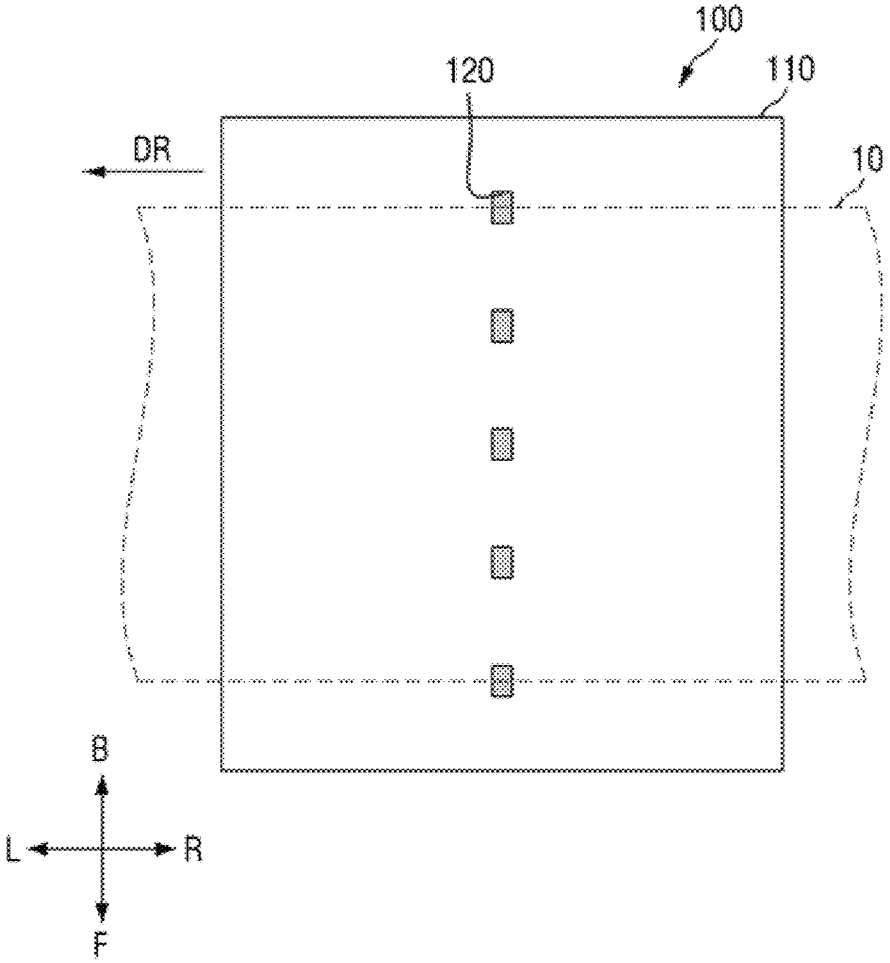
FIG. 3 illustrates the arrangement of a plurality of first ultrasonic oscillators in the cleaning unit of FIG. 2.

FIG. 1 is a conceptual diagram illustrating a substrate treatment apparatus according to a first embodiment of the present disclosure. FIG. 2 illustrates a cleaning unit 100 illustrated in FIG. 1. FIG. 3 illustrates the arrangement of a plurality of first ultrasonic oscillators 120 in the cleaning unit 100 of FIG. 2.

First, referring to FIG. 1, the substrate treatment apparatus according to the first embodiment of the present disclosure includes a substrate 10, a head 50, and the cleaning unit 100.

The substrate 10 may be rotated in one direction by a plurality of driving rolls 20. Therefore, the substrate 10 may move along a movement direction DR. In the drawing, the movement direction DR is illustrated as a direction of movement from a first side (R direction in FIG. 2) to a second side (L direction in FIG. 2). The substrate 10 may be a flexible substrate, for example, may be a film wound in a roll shape, but the present disclosure is not limited thereto. For example, the substrate 10 may also be a substrate (a glass substrate, a silicon substrate, etc.) fixed/placed on a belt rotating in one direction by the driving rolls 20.

The head 50 is disposed above (U direction in FIG. 2) the substrate 10 rotated by the driving rolls 20 and ejects ink 51 onto a surface of the substrate 10.

The cleaning unit 100 is disposed under (D direction in FIG. 2) the substrate 10 rotated by the driving rolls 20 and cleans an impact group 52 formed on the surface of the substrate 10 by the ejected ink 51. The cleaning unit 100 cleans the impact group 52 using a water film formed by ultrasonic oscillation.

Here, referring to FIG. 2, the cleaning unit 100 includes a first bath 110, a first ultrasonic oscillator 120, a cleaning solution supply unit 140, and a cleaning solution discharge unit 150.

The first bath 110 stores a cleaning solution, and a first opening 110*a* is formed in an upper surface of the first bath 110. The cleaning solution may be various chemicals for cleaning the impact group 52 and may be, for example, but is not limited to, deionized water (DIW).

The first ultrasonic oscillator 120 is installed in the first bath 110.

The first ultrasonic oscillator 120 provides ultrasonic waves toward a surface 130 of the cleaning solution exposed by the first opening 110*a* to form a water film 131 protruding from the surface 130 of the cleaning solution.

A height H0 of the protruding water film 131 may be adjusted by adjusting the oscillation output of the first ultrasonic oscillator 120. In the substrate treatment apparatus according to the first embodiment of the present disclosure, the height H0 of the protruding water film 131 may be, for example, but is not limited to, about 10 to 15 mm from the surface 130 of the cleaning solution.

A target material to be cleaned may be changed by adjusting the oscillation frequency of the first ultrasonic oscillator 120.

For example, oscillation frequencies may be divided into an ultrasonic and a megasonic.

The ultrasonic may be in a range of tens to hundreds of kHz, for example, in a range of 20 to 400 kHz. The ultrasonic enables cleaning using a cavitation phenomenon. When the ultrasonic is applied into a cleaning solution, bubbles in the cleaning solution may burst to destroy or isolate foreign substances from an object to be cleaned.

The megasonic may be in a range of several MHz, for example, in a range of 700 kHz to 1.2 MHz. Sub-micron-sized foreign substances can be removed using the megasonic. Unlike the ultrasonic frequency, the megasonic exfoliates foreign substances from an object to be cleaned by increasing particle acceleration without causing the cavitation phenomenon.

The ultrasonic can remove relatively large foreign substances (e.g., several μm), and the megasonic can remove relatively small foreign substances (e.g., 1 μm or less).

The first ultrasonic oscillator 120 generates ultrasonic waves having an oscillation frequency in an appropriate range by considering the size of a target material.

The substrate 10 is not immersed in the first bath 110, and the surface of the substrate 10 passes near the first opening 110*a*. The surface of the substrate 10 is cleaned by the protruding water film 131 formed by the first ultrasonic oscillator 120.

FIG. 3 is a plan view of the first bath 110 seen from above. As illustrated, the substrate 10 may move along the movement direction DR (e.g., from the first side R to the second side L). A plurality of first ultrasonic oscillators 120 may be installed in the first bath 110. The first ultrasonic oscillators 120 may be arranged in the first bath 110 to be parallel to a width direction of the substrate 10. Although the first ultrasonic oscillators 120 are arranged in a line in a direction from the front F to the rear B in the drawing, the present disclosure is not limited thereto. Since the first ultrasonic oscillators 120 are arranged parallel to the width direction of the substrate 10, foreign substances (that is, including the impact group 52) on the entire surface of the substrate 10 can be efficiently cleaned.

Referring back to FIG. 2, the first bath 110 includes an inlet 141 through which the cleaning solution is supplied and an outlet 151 through which the cleaning solution is discharged.

The inlet 141 is connected to the cleaning solution supply unit 140. Although not specifically illustrated, the cleaning solution supply unit 140 may include a storage tank for storing the cleaning solution, a pump for supplying the cleaning solution from the storage tank, and/or a valve for controlling the amount of cleaning solution supplied.

The outlet 151 is connected to the cleaning solution discharge unit 150. Although not specifically illustrated, the cleaning solution discharge unit 150 may include a storage tank for storing the discharged cleaning solution and/or a recycler for recycling the discharged cleaning solution.

In particular, when the substrate 10 moves from the first side R to the second side L, the inlet 141 is located on a second sidewall 110L located on the second side L among sidewalls of the first bath 110. In addition, the outlet 151 is located on a first sidewall 110R located on the first side R among the sidewalls of the first bath 110. In addition, the inlet 141 is located lower than the outlet 151 in the first bath 110. In addition, while the substrate 10 is being cleaned, the cleaning solution is continuously supplied through the inlet 141. Due to this position of the inlet 141 and the cleaning solution supplying method, the cleaning solution flows from the second side L to the first side R in the first bath 110.

That is, the substrate 10 moves from the first side R to the second side L, and the cleaning solution flows from the second side L to the first side R. Therefore, it is possible to prevent the cleaned surface of the substrate 10 from being re-contaminated. This is because even if foreign substances separated from the surface of the substrate 10 by the protruding water film 131 fall onto the surface 130 of the cleaning solution, they may be discharged through the outlet 151 on the first side R without adhering to the surface of the substrate 10 again.

Figure 4:
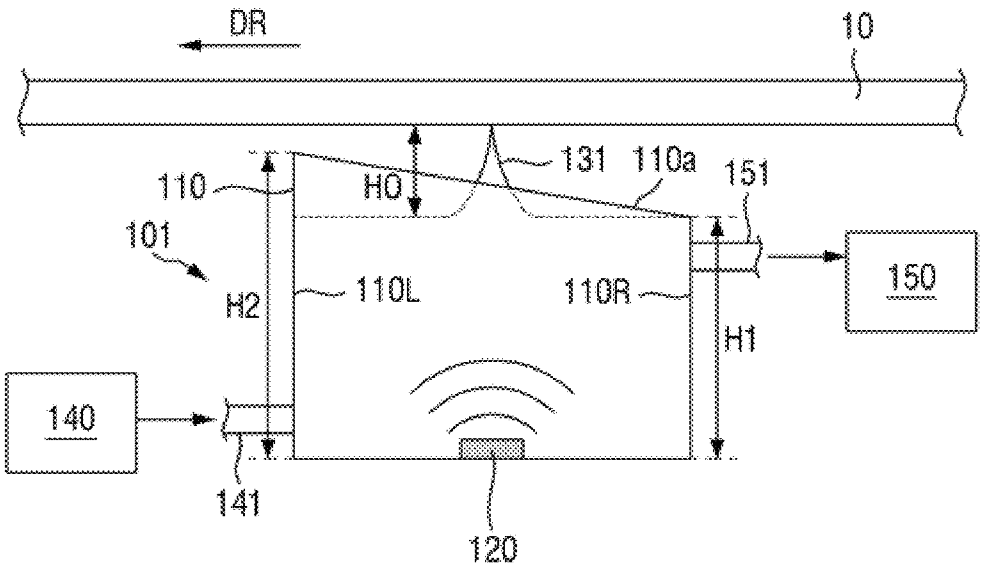
FIG. 4 illustrates a cleaning unit used in a substrate treatment apparatus according to a second embodiment of the present disclosure.

FIG. 4 illustrates a cleaning unit 101 used in a substrate treatment apparatus according to a second embodiment of the present disclosure. For ease of description, the following description will focus on differences from elements and features described above with reference to FIGS. 1 through 3.

Referring to FIG. 4, an upper surface of a first bath 110 of the cleaning unit 101 is inclined. Therefore, a first opening 110*a* formed in the upper surface may also be inclined.

Specifically, when a substrate 10 moves from a first side R to a second side L, a first height H1 of a first sidewall 110R located on the first side R among sidewalls of the first bath 110 is lower than a second height H2 of a second sidewall 110L located on the second side L.

A surface of the substrate 10 should pass near the first opening 110*a* of the first bath 110 without colliding with (i.e., without contacting) the second sidewall 110L. Here, a water film 131 must have a height H0 sufficient to clean the surface of the substrate 10. To this end, the height H0 of the water film 131 may be greater than a difference between the first height H1 and the second height H2 (i.e., $H0>H2-H1$).

Since the first bath 110 is structured as described above (i.e., $H2>H1$), it is possible to prevent the cleaned surface of the substrate 10 from being re-contaminated. When a cleaning solution supply unit 140 continuously and sufficiently supplies a cleaning solution, the cleaning solution may flow not only to an outlet 151 but also over the sidewalls of the first bath 110. However, since the second height H2 of the second sidewall 110L is higher than the first height H1 of the first sidewall 110R, the cleaning solution overflows in the direction of the first sidewall 110R, but not in the direction of the second sidewall 110L.

Since the substrate 10 moves from the first side R to the second side L, a portion of the substrate 10 (i.e., the substrate 10 located on the first side R) before contacting the protruding water film 131 is in an uncleaned state, and a portion of the substrate 10 (i.e., the substrate 10 located on the second side L) after contacting the protruding water film 131 is in a cleaned state. If the cleaning solution overflows in the direction of the second sidewall 110L, there is a possibility that the cleaned substrate 10 will be re-contaminated. Therefore, recontamination of the cleaned substrate 10 may be prevented by inducing the cleaning solution to overflow only in the direction of the first sidewall 110R.

Figure 5:
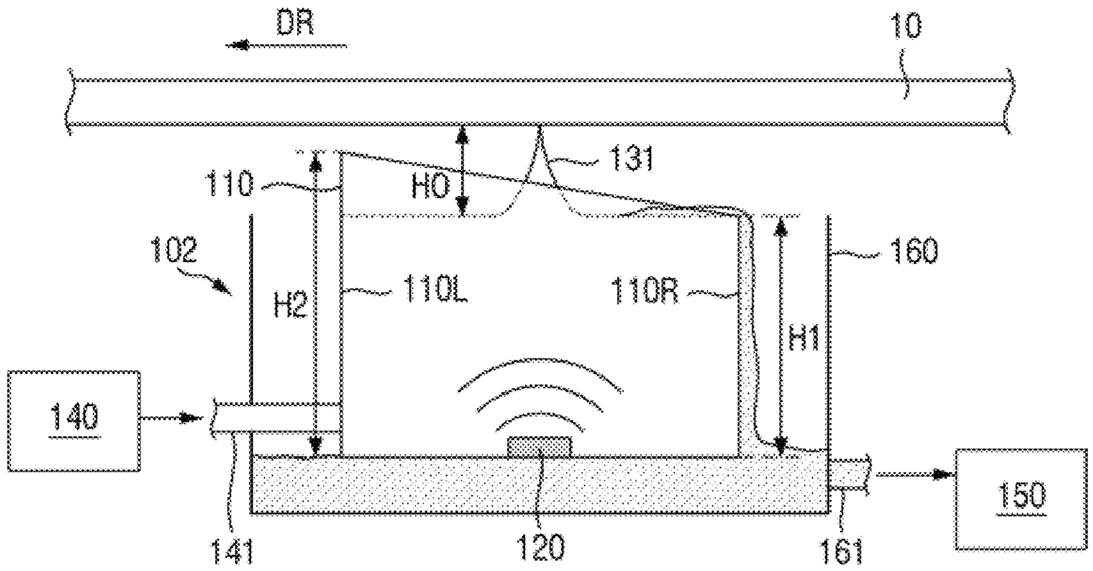
FIG. 5 illustrates a cleaning unit used in a substrate treatment apparatus according to a third embodiment of the present disclosure.

FIG. 5 illustrates a cleaning unit 102 used in a substrate treatment apparatus according to a third embodiment of the present disclosure. For ease of description, the following description will focus on differences from elements and features described above with reference to FIGS. 1 through 4.

Referring to FIG. 5, the cleaning unit 102 includes a first bath 110 and an auxiliary bath 160 surrounding the first bath 110.

As described above, a first height H1 of a first sidewall 110R located on a first side R is lower than a second height H2 of a second sidewall 110L located on a second side L. Here, when a cleaning solution supply unit 140 continuously and sufficiently supplies a cleaning solution, the cleaning solution overflows in the direction of the first side wall 110R, but not in the direction of the second side wall 110L.

The auxiliary bath 160 is formed to surround the first bath 110 and temporarily stores the cleaning solution overflowing from the first bath 110. An outlet 161 is installed on the first side R of the auxiliary bath 160. The outlet 161 is connected to a cleaning solution discharge unit 150.

Figure 6:
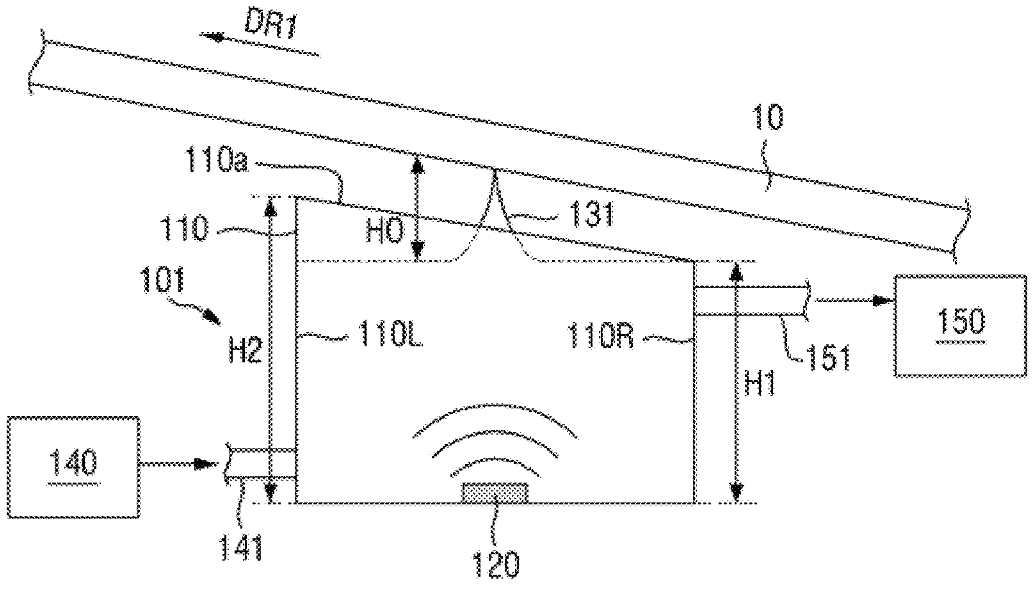
FIG. 6 illustrates a cleaning unit used in a substrate treatment apparatus according to a fourth embodiment of the present disclosure.

FIG. 6 illustrates a cleaning unit used in a substrate treatment apparatus according to a fourth embodiment of the present disclosure. For ease of description, the following description will focus on differences from elements and features described above with reference to FIGS. 1 through 4.

Referring to FIG. 6, a movement direction DR1 of a substrate 10 is inclined. The degree of inclination of the movement direction DR1 and the degree of inclination of a first opening 110*a* may be substantially the same. Even if the movement direction DR1 of the substrate 10 is not flat, a first bath 110 can be freely repositioned and installed within a range in which the substrate 10 does not collide with a second sidewall 110L.

Figure 7:
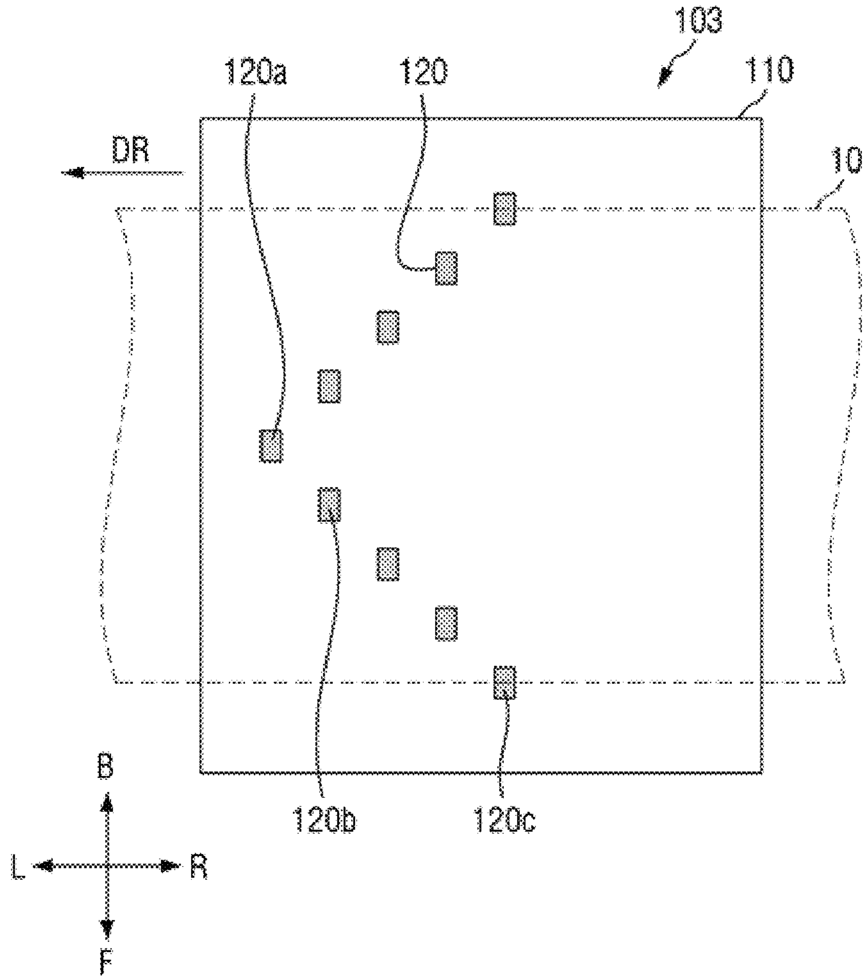
FIG. 7 illustrates a cleaning unit used in a substrate treatment apparatus according to a fifth embodiment of the present disclosure.

FIG. 7 illustrates a cleaning unit used in a substrate treatment apparatus according to a fifth embodiment of the present disclosure.

Referring to FIG. 7, a substrate 10 moves along a movement direction DR (e.g., from a first side R to a second side L).

A plurality of first ultrasonic oscillators 120 may be installed in a first bath 110. The first ultrasonic oscillators 120 may be arranged in a "<" shape, and a vertex (see 120*a*) of the "<" shape may face the second side L.

In this arrangement, when the substrate 10 moves from the first side R to the second side L, the substrate 10 is sequentially cleaned from a center of the substrate 10 to an edge of the substrate 10. That is, the substrate 10 starts to be cleaned from the center by a first ultrasonic oscillator 120*a* located at the vertex of the "<" shape. When the substrate 10 moves slightly toward the second side L, it is cleaned by first ultrasonic oscillators 120*b*. In this way, when the substrate 10 completely moves to the second side L, the edge of the substrate 10 is cleaned by first ultrasonic oscillators 120*c* located at the end of the "<" shape.

Figure 8:
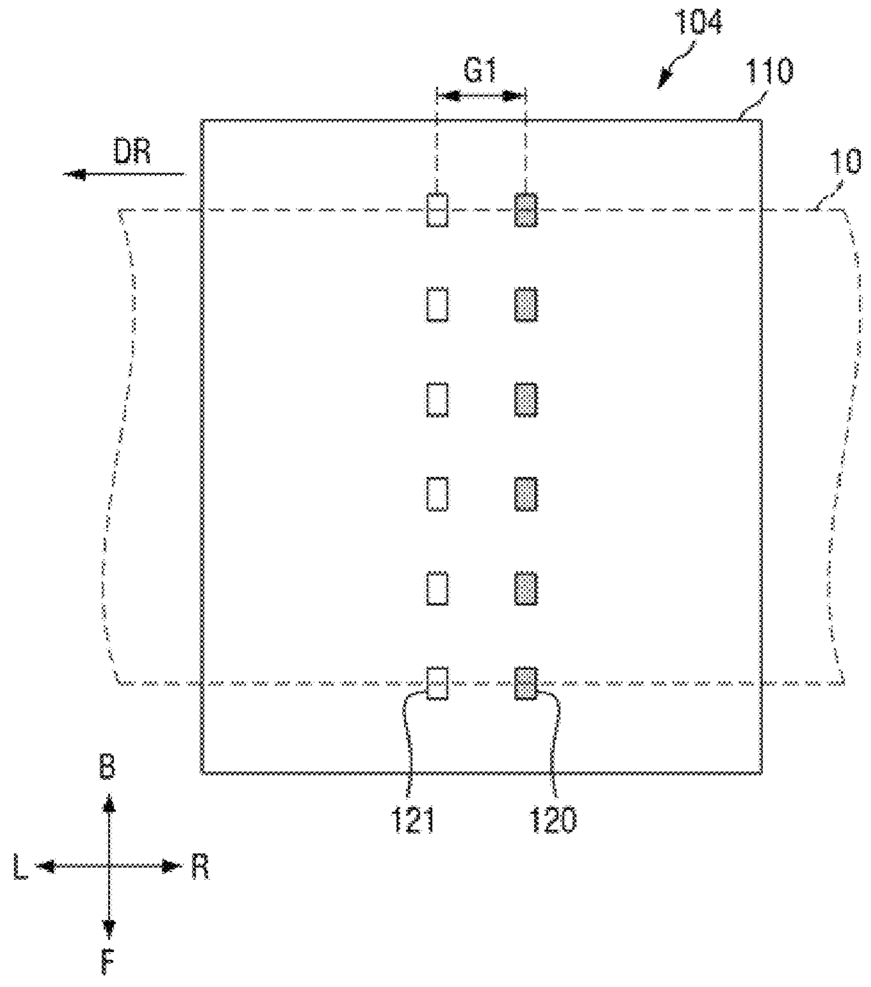
FIG. 8 illustrates a cleaning unit used in a substrate treatment apparatus according to a sixth embodiment of the present disclosure.
Figure 9:
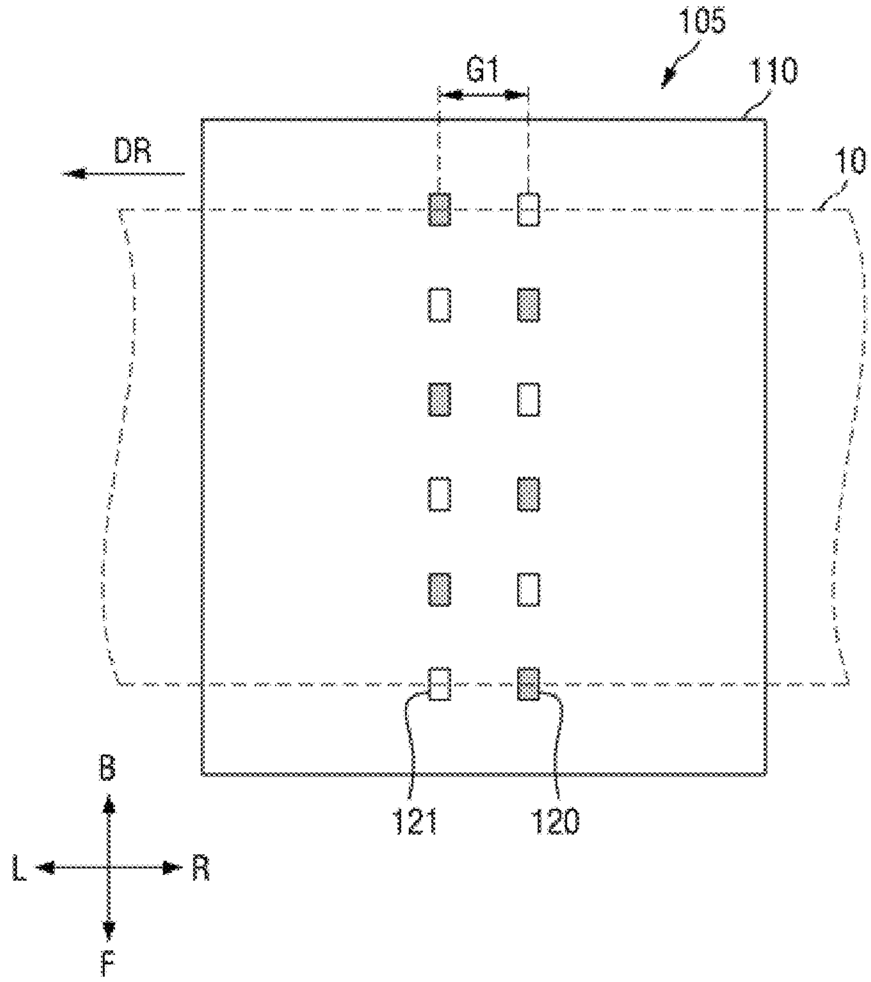
FIG. 9 illustrates a cleaning unit used in a substrate treatment apparatus according to a seventh embodiment of the present disclosure.

FIG. 8 illustrates a cleaning unit used in a substrate treatment apparatus according to a sixth embodiment of the present disclosure. FIG. 9 illustrates a cleaning unit used in a substrate treatment apparatus according to a seventh embodiment of the present disclosure.

Referring to FIGS. 8 and 9, a plurality of first ultrasonic oscillators 120 and a plurality of second ultrasonic oscillators 121 are installed in a first bath 110.

The first ultrasonic oscillators 120 and the second ultrasonic oscillators 121 may remove foreign substances having different sizes. The first ultrasonic oscillators 120 may generate ultrasonic to remove relatively large foreign substances. The second ultrasonic oscillators 121 may generate megasonic to remove relatively small foreign substances.

As illustrated in FIG. 8, the first ultrasonic oscillators 120 are arranged in a line in a direction from the front F to the rear B. The second ultrasonic oscillators 121 are also arranged in a line in the direction from the front F to the rear B. The heat generated by the first ultrasonic oscillators 120 and the heat generated by the second ultrasonic oscillators 121 may be spaced apart from each other by a predetermined distance G1.

As illustrated in FIG. 9, in the first bath 110, the first ultrasonic oscillators 120 and the second ultrasonic oscillators 121 may be arranged in a zigzag manner.

Figure 10:
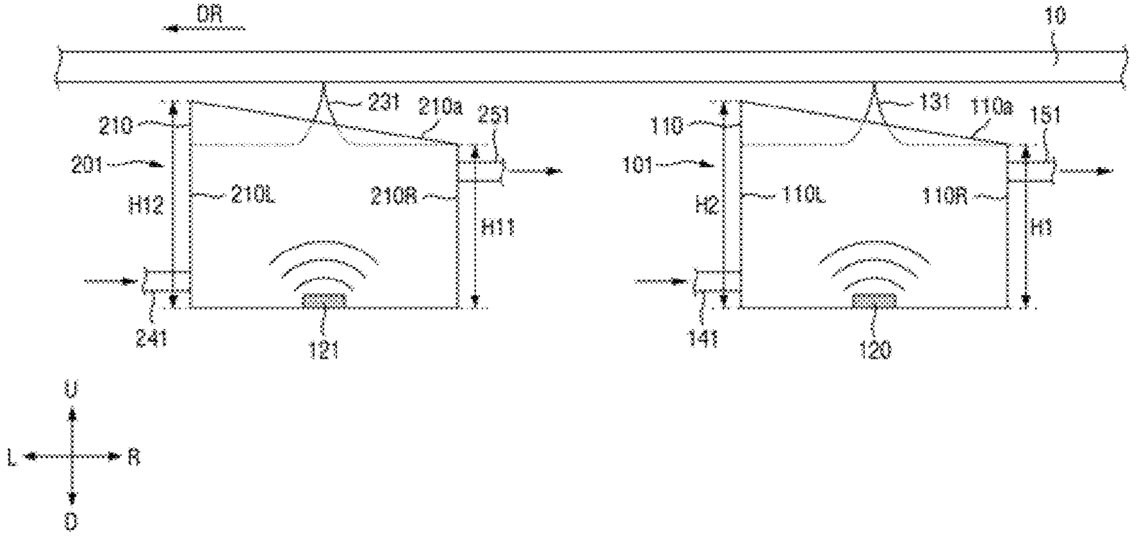
FIG. 10 is a conceptual diagram illustrating cleaning units used in a substrate treatment apparatus according to an eighth embodiment of the present disclosure.

FIG. 10 is a conceptual diagram illustrating cleaning units used in a substrate treatment apparatus according to an eighth embodiment of the present disclosure.

Referring to FIG. 10, the substrate treatment apparatus according to the eighth embodiment of the present disclosure includes a first cleaning unit 101 and a second cleaning unit 201 arranged sequentially.

A first bath 110 stores a cleaning solution, and a first opening 110*a* is formed in an upper surface of the first bath 110. When a substrate 10 moves from a first side R to a second side L, a height H1 of a first sidewall 110R located on the first side R among sidewalls of the first bath 110 is lower than a second height H2 of a second sidewall 110L located on the second side L.

A first ultrasonic oscillator 120 is installed in the first bath 110 and provides ultrasonic waves of a first frequency toward a surface of the cleaning solution exposed by the first opening 110*a*. A first water film 131 protruding from the surface of the cleaning solution is formed by the ultrasonic waves of the first frequency.

A second bath 210 is disposed on a side of the first bath 110. When viewed in a movement direction DR of the substrate 10, the second bath 210 is disposed behind the first bath 110. The second bath 210 stores a cleaning solution, and a second opening 210*a* is formed in an upper surface of the second bath 210.

When the substrate 10 moves from the first side R to the second side L, a third height H11 of a third sidewall 210R located on the first side R among sidewalls of the second bath 210 is lower than a fourth height H12 of a fourth sidewall 210L located on the second side L.

A second ultrasonic oscillator 121 is installed in the second bath 210 and provides ultrasonic waves of a second frequency greater than the first frequency toward a surface of the cleaning solution exposed by the second opening 210*a*. A second water film 231 protruding from the surface of the cleaning solution is formed by the ultrasonic waves of the second frequency.

As the substrate 10 wound in a roll shape is unwound, it sequentially passes above the first bath 110 and above the second bath 210. However, the substrate 10 is not immersed in the first bath 110 and the second bath 210. As a surface of the substrate 10 passes near the first opening 110*a* and the second opening 210*a*, it is cleaned by the protruding first water film 131 and the second water film 231.

The ultrasonic waves of the first frequency may be, for example, ultrasonic. The ultrasonic waves of the second frequency may be, for example, megasonic. Therefore, relatively large foreign substances (e.g., several μm) are removed by the ultrasonic waves of the first frequency, and relatively small foreign substances (e.g., 1 μm or less) are removed by the ultrasonic waves of the second frequency. Since the first cleaning unit 101 and the second cleaning unit 201 using various oscillation frequencies are sequentially arranged, it is possible to remove foreign substances of various sizes, thereby increasing cleaning efficiency.

While the substrate 10 is being cleaned, the cleaning solution is continuously supplied through an inlet of the first bath 110 to flow over the first sidewall 110R. The cleaning solution is continuously supplied through an inlet of the second bath 210 to flow over the third sidewall 210R.

Due to this structure of the first bath 110 and the second bath 210 and the cleaning solution supplying method described above, it is possible to prevent the cleaned surface of the substrate 10 from being re-contaminated.

Figure 11:
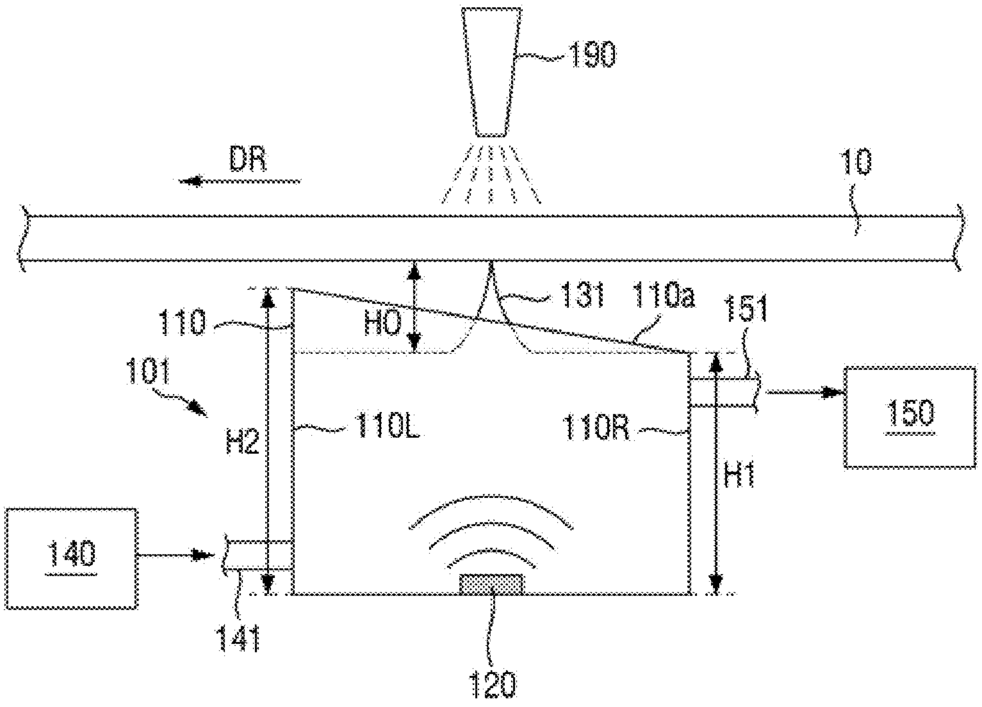
FIG. 11 is a conceptual diagram illustrating a cleaning unit used in a substrate treatment apparatus according to a ninth embodiment of the present disclosure.

FIG. 11 is a conceptual diagram illustrating a cleaning unit used in a substrate treatment apparatus according to a ninth embodiment of the present disclosure. For ease of description, the following description will focus on differences from elements and features described above with reference to FIGS. 1 through 10.

Referring to FIG. 11, the substrate treatment apparatus according to the ninth embodiment further includes a gas supply unit 190 disposed above a first bath 110. A substrate 10 is disposed between the first bath 110 and the gas supply unit 190 such that the other surface of the substrate 10 (i.e., a surface opposite a surface cleaned by a protruding water film 131) faces the gas supply unit 190.

The gas supply unit 190 may supply gas to the other surface of the substrate 10 to prevent contamination of the other surface of the substrate 10. The gas supply unit 190 may supply gas having a positive pressure.

The gas supply unit 190 may have various shapes. As illustrated, the gas supply unit 190 may be in the form of an air knife.

Figure 12:
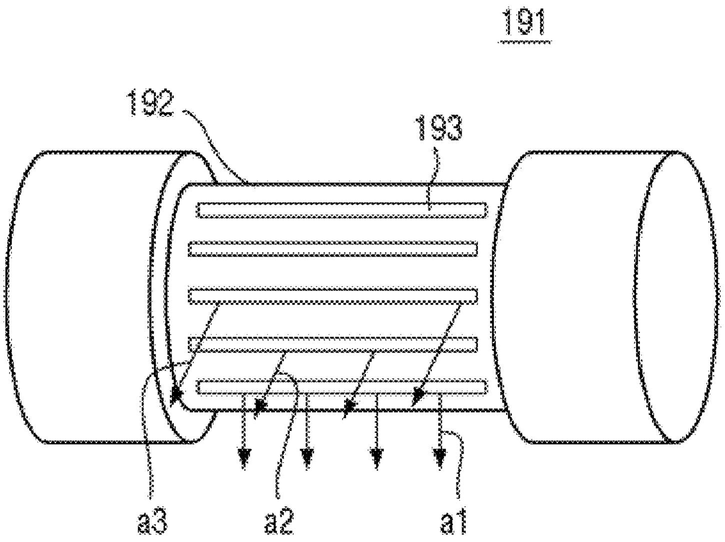
FIG. 12 is a perspective view of another example of a gas supply unit illustrated in FIG. 11.

FIG. 12 is a perspective view of another example of the gas supply unit 190 illustrated in FIG. 11.

Referring to FIG. 12, a gas supply unit 191 includes a cylindrical body 192 and a plurality of gas outlets 193 formed in side surfaces of the body 192. Each of the gas outlets 193 extends in a longitudinal direction.

The gas outlets 193 may supply gas having a positive pressure in different directions (see reference numerals a1, a2, and a3). Therefore, it is possible to supply gas to various regions of the substrate, thereby preventing contamination of the other surface of the substrate. In addition, when the substrate is a flexible substrate (i.e., a film wound in a roll shape), the gas supply unit 191 may be formed above a region where the substrate is bent. Even in this case, since the gas supply unit 191 can supply gas in various directions, the contamination prevention efficiency can be increased.

Figure 13:
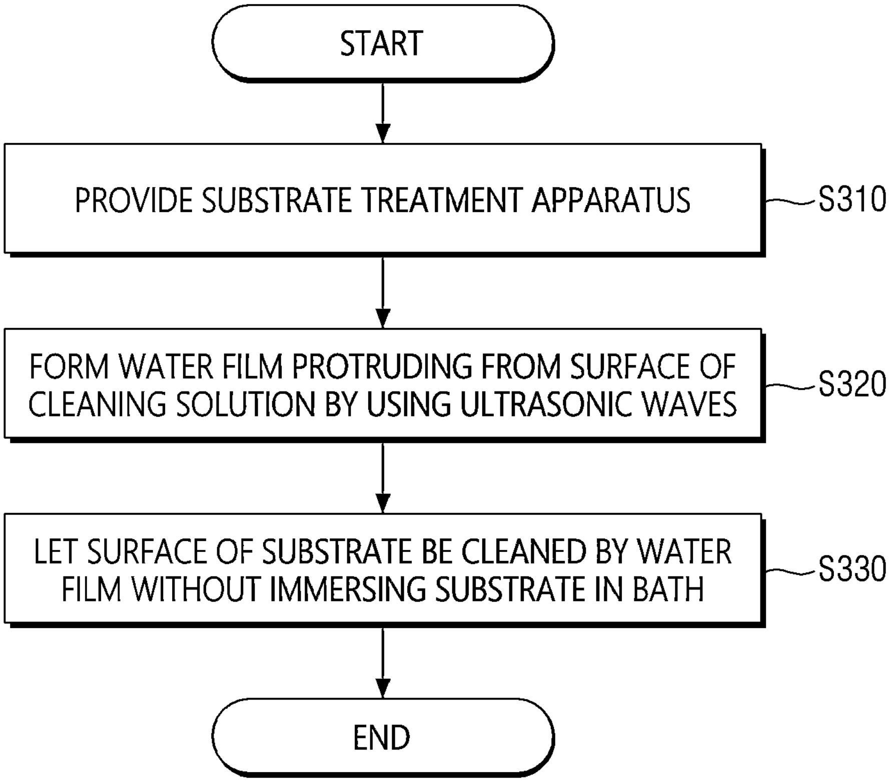
FIG. 13 is a flowchart illustrating a substrate treatment method according to embodiments of the present disclosure.

FIG. 13 is a flowchart illustrating a substrate treatment method according to embodiments of the present disclosure.

Referring to FIGS. 2 and 13, first, a substrate treatment apparatus is provided (operation S310). The substrate treatment apparatus includes a first bath 110 storing a cleaning solution and having an opening 110*a* formed in an upper surface thereof and a first ultrasonic oscillator 120 installed in the first bath 110.

Next, the first ultrasonic oscillator 120 provides ultrasonic waves toward a surface 130 of the cleaning solution exposed by the opening 110*a* to form a water film 131 protruding from the surface 130 of the cleaning solution.

Next, as a substrate 10 wound in a roll shape is unwound, a surface of the substrate 10 passes near the opening 110*a* of the first bath 110 and is cleaned by the water film 131 without the substrate 10 being immersed in the first bath 110.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A substrate treatment apparatus comprising:

a first bath storing a cleaning solution and having a first opening formed in an upper surface thereof; and a first ultrasonic oscillator installed in the first bath and providing ultrasonic waves toward a surface of the cleaning solution exposed by the first opening to form a water film protruding from the surface of the cleaning solution; and a gas supply unit configured to supply gas to the substrate, the gas supply unit comprising a cylindrical body and a plurality of gas outlets formed in a side surface of the body, wherein each of the gas outlets extends in a longitudinal direction of the body, wherein a substrate is not immersed in the first bath, and a surface of the substrate is placed adjacent to the first opening and cleaned by the water film, and the gas supply unit is disposed above the first bath, and the substrate is disposed between the first bath and the gas supply unit such that the other surface of the substrate faces the gas supply unit, to prevent contamination of the other surface of the substrate by supplying gas to the other surface of the substrate.

2. The apparatus of claim 1, wherein the substrate moves from a first side to a second side, and a first height of a first sidewall of the first bath located on the first side is lower than a second height of a second sidewall of the first bath located on the second side.

3. The apparatus of claim 2, wherein a height of the water film is greater than a difference between the first height and the second height.

4. The apparatus of claim 2, wherein an inlet through which the cleaning solution is supplied into the first bath is installed on the second sidewall.

5. The apparatus of claim 4, wherein while the substrate is being cleaned, the cleaning solution is continuously supplied through the inlet.

6. The apparatus of claim 4, wherein an outlet through which the cleaning solution is discharged from the first bath is installed on the first sidewall.

7. The apparatus of claim 1, wherein the substrate is a film wound in a roll shape, and the film is cleaned by the protruding water film as the film is unwound and passes an upper surface of the first opening of the first bath.

8. The apparatus of claim 1, wherein the substrate moves from a first side to a second side and further comprising:

a second bath located on the second side of the first bath, storing a cleaning solution, and having a second opening formed in an upper surface thereof; and a second ultrasonic oscillator installed in the second bath and providing ultrasonic waves toward a surface of the cleaning solution exposed by the second opening to form a water film protruding from the surface of the cleaning solution, wherein a first frequency of the first ultrasonic oscillator and a second frequency of the second ultrasonic oscillator are different from each other.

9. The apparatus of claim 8, wherein the second frequency is greater than the first frequency.

10. The apparatus of claim 1, wherein the first ultrasonic oscillator is provided in plural numbers, and the first ultrasonic oscillators are arranged in a line.

11. The apparatus of claim 1, wherein the substrate moves from a first side to a second side, the first ultrasonic oscillator is provided in plural numbers, and the first ultrasonic oscillators are arranged in a "<" shape such that a vertex of the "<" shape faces the second side.

12. A substrate treatment apparatus comprising:

a first bath storing a cleaning solution and having a first opening formed in an upper surface thereof;

a first ultrasonic oscillator installed in the first bath and providing ultrasonic waves of a first frequency toward a surface of the cleaning solution exposed by the first opening to form a first water film protruding from the surface of the cleaning solution;

a second bath located on a side of the first bath, storing a cleaning solution, and having a second opening formed in an upper surface thereof;

a second ultrasonic oscillator installed in the second bath and providing ultrasonic waves of a second frequency greater than the first frequency toward a surface of the cleaning solution exposed by the second opening to form a second water film protruding from the surface of the cleaning solution;

a gas supply unit configured to supply gas to the substrate, the gas supply unit comprising a cylindrical body and a plurality of gas outlets formed in a side surface of the body, wherein each of the gas outlets extends in a longitudinal direction of the body, wherein as a substrate wound in a roll shape is unwound, the substrate sequentially passes above the first bath and above the second bath without being immersed in the first bath and the second bath, a surface of the substrate is cleaned by the first water film and the second water film as the surface of the substrate passes near the first opening and the second opening, and the first bath comprises a first sidewall not facing the second bath and a second sidewall facing the second bath, wherein a second height of the second sidewall is higher than a first height of the first sidewall, and the gas supply unit is disposed above the first bath, and the substrate is disposed between the first bath and the gas supply unit such that the other surface of the substrate faces the gas supply unit, to prevent contamination of the other surface of the substrate by supplying gas to the other surface of the substrate.

13. The apparatus of claim 12, wherein a height of the first water film is greater than a difference between the first height and the second height.

14. The apparatus of claim 12, wherein an inlet through which the cleaning solution is supplied into the first bath is installed on the second sidewall.

15. The apparatus of claim 14, wherein while the substrate is being cleaned, the cleaning solution is continuously supplied through the inlet to flow over the first sidewall.

* * * * *